US012790980B2

(12) United States Patent
Stratton

(10) Patent No.: US 12,790,980 B2
(45) Date of Patent: Nov. 10, 2026

(54) HEAT EXCHANGE SYSTEM FOR AIRCRAFT ENGINE

(71) Applicant: PRATT & WHITNEY CANADA CORP., Longueuil (CA)

(72) Inventor: Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 238 days.

(21) Appl. No.: 18/606,474

(22) Filed: Mar. 15, 2024

(65) Prior Publication Data

US 2025/0290448 A1 Sep. 18, 2025

(51) Int. Cl.
*F02C 7/14* (2006.01)
*F28F 27/02* (2006.01)

(52) U.S. Cl.
CPC ................ *F02C 7/14* (2013.01); *F28F 27/02* (2013.01); *F05D 2260/213* (2013.01); *F28F 2250/06* (2013.01)

(58) Field of Classification Search
CPC .................................. F02C 7/224; F28F 27/02
See application file for complete search history.

(56) References Cited

U.S. PATENT DOCUMENTS

2013/0086909 A1 4/2013 Wang et al.
2016/0281656 A1* 9/2016 Alecu ..................... F02C 7/236
2020/0088102 A1 3/2020 Roberge
2021/0190421 A1* 6/2021 Le Bot ................. F25J 3/04478
2022/0195927 A1 6/2022 Rambo
2023/0068644 A1 3/2023 Thivierge et al.
2025/0042568 A1* 2/2025 Calderón Gómez .. B64D 41/00
2025/0198343 A1* 6/2025 Keeler ...................... F02C 7/14

FOREIGN PATENT DOCUMENTS

CN 115573815 A 1/2023
WO 2024003083 A1 1/2024

OTHER PUBLICATIONS

European Seach Report issued in counterpart EP application No. 25164253.4 on Jul. 28, 2025.

* cited by examiner

*Primary Examiner* — Eric S Ruppert
(74) *Attorney, Agent, or Firm* — NORTON ROSE FULBRIGHT CANADA LLP

(57) ABSTRACT

An aircraft engine, comprising: a thermal engine having an outlet; a heat exchanger having a first conduit connected to a source of a fluid, and a second conduit connected to the outlet; an inlet conduit connecting the source to the first conduit; an outlet conduit connected to an outlet of the first conduit; a component connected to the outlet conduit; a bypass conduit and a recirculation conduit both connecting the inlet conduit to the outlet conduit while bypassing the heat exchanger; a valve communicating with the recirculation conduit and the bypass conduit, the valve operable to selectively allow the fluid to flow in one of the recirculation conduit and the bypass conduit while limiting the fluid from flowing in the other of the recirculation conduit and the bypass conduit; and a flow inducer communicating with the recirculation conduit for inducing a flow from the outlet conduit to the inlet conduit.

13 Claims, 6 Drawing Sheets

HEAT EXCHANGE SYSTEM FOR AIRCRAFT ENGINE

TECHNICAL FIELD

The application relates generally to aircraft engines and, more particularly, to heat exchange systems and methods for controlling temperatures of fluids in an aircraft engine.

BACKGROUND

Aircraft engines use heat exchanger to exchange heat between different fluids. Examples of such heat exchangers include the fuel-oil heat exchanger (FOHE) and the air-cooled oil cooler (ACOC). In some configurations, components downstream of the heat exchangers are sensitive to temperature variations of an incoming fluid. Existing heat exchangers may be satisfactory to some extend, but improvements are nevertheless sought.

SUMMARY

In one aspect, there is provided an aircraft engine, comprising: a thermal engine having an outlet outputting exhaust gases; a heat exchanger having a first conduit fluidly connected to a source of a fluid being at a lower temperature than the exhaust gases, and a second conduit fluidly connected to the outlet of the thermal engine and in heat exchange relationship with the first conduit; an inlet conduit fluidly connecting the source of the fluid to an inlet of the first conduit of the heat exchanger; an outlet conduit fluidly connected to an outlet of the first conduit of the heat exchanger; a component fluidly connected to the outlet conduit; a bypass conduit fluidly connecting the inlet conduit to the outlet conduit while bypassing the heat exchanger; a recirculation conduit fluidly connecting the outlet conduit to the inlet conduit while bypassing the heat exchanger; one or more valve in fluid communication with the recirculation conduit and the bypass conduit, the one or more valve operable to selectively allow the fluid to flow in one of the recirculation conduit and the bypass conduit while limiting the fluid from flowing in the other of the recirculation conduit and the bypass conduit; and a flow inducer in fluid communication with the recirculation conduit for inducing a flow from the outlet conduit to the inlet conduit via the recirculation conduit.

The aircraft engine described above may include any of the following features, in any combinations.

In some embodiments, the aircraft engine includes: a sensor operatively connected to the outlet conduit; and a controller operatively connected to the sensor and to the one or more valve, the controller having a processing unit and a computer-readable medium operatively connected to the processing unit and having instructions stored thereon executable by the processing unit to: receive a signal from the sensor, the signal indicative that the temperature of the fluid is outside a temperature threshold; configure the one or more valve in a bypass configuration when the temperature of the fluid is above the temperature threshold, the inlet conduit fluidly connected to the outlet conduit via the bypass conduit in the bypass configuration of the one or more valve; and configure the one or more valve in a recirculation configuration when the temperature of the fluid is below the temperature threshold, the outlet conduit fluidly connected to the inlet conduit via the recirculation conduit in the recirculation configuration of the one or more valve.

In some embodiments, the computer-readable medium has the instructions stored thereon executable by the processing unit to: adjust a flow rate of the fluid flowing through the one or more valve until the controller receives a signal from the sensor indicative that the temperature is within the temperature threshold.

In some embodiments, the flow inducer is a venturi fluidly connected to the inlet conduit upstream of the heat exchanger, the venturi having a throat and defining a suction inlet at the throat, the recirculation conduit fluidly connected to the suction inlet.

In some embodiments, the one or more valve includes both of a recirculation valve in fluid communication with the recirculation conduit and a bypass valve in fluid flow communication with the bypass conduit, the controller operatively connected to the recirculation valve and to the bypass valve.

In some embodiments, the computer-readable medium has the instructions stored thereon executable by the processing unit to: configure the one or more valve in a bypass configuration by causing the bypass valve to open and by causing the recirculation valve to close or to remain closed; and to configure the one or more valve in a recirculation configuration by causing the recirculation valve to open and by causing the bypass valve to close or to remain closed.

In some embodiments, the flow inducer is a pump fluidly connected to the recirculation conduit, the bypass conduit bypassing the pump, the controller operatively connected to the pump, wherein the computer-readable medium has the instructions stored thereon executable by the processing unit to: cause the pump to drive a flow of the fluid from the outlet conduit to the inlet conduit when the one or more valve is in the recirculation configuration.

In some embodiments, the one or more valve is a three-way valve, the three-way valve fluidly connecting the inlet conduit to the outlet conduit via the bypass conduit in the bypass configuration and fluid connecting the outlet conduit to the inlet conduit in the recirculation configuration.

In some embodiments, the source of the fluid is a source of liquid hydrogen.

In some embodiments, the component is an expansion turbine.

In another aspect, there is provided a heat exchange system for an aircraft engine, comprising: a heat exchanger having a first conduit and a second conduit in heat exchange relationship with the first conduit, the first conduit fluidly connected to an inlet conduit upstream of the heat exchanger relative to a flow of a fluid through the first conduit, and fluidly connected to an outlet conduit downstream of the heat exchanger, the second conduit receiving exhaust gases generated by aircraft engine; a bypass conduit fluidly connecting the inlet conduit to the outlet conduit and extending in parallel to the first conduit of the heat exchanger; a recirculation conduit fluidly connecting the outlet conduit to the inlet conduit and extending in parallel to the first conduit of the heat exchanger; one or more valve in fluid communication with the recirculation conduit and the bypass conduit, the one or more valve operable to selectively allow the fluid to flow in one of the recirculation conduit and the bypass conduit while limiting the fluid from flowing in the other of the recirculation conduit and the bypass conduit; and a flow inducer in fluid communication with the recirculation conduit for inducing a flow from the outlet conduit to the inlet conduit via the recirculation conduit.

The heat exchange system described above may include any of the following features, in any combinations.

In some embodiments, the heat exchange system includes: a sensor operatively connected to the outlet conduit; and a controller operatively connected to the sensor and to the one or more valve, the controller having a processing unit and a computer-readable medium operatively connected to the processing unit and having instructions stored thereon executable by the processing unit to: receive a signal from the sensor, the signal indicative that a temperature of the fluid is outside a temperature threshold; configure the one or more valve in a bypass configuration when the temperature of the fluid is above the temperature threshold, the inlet conduit fluidly connected to the outlet conduit via the bypass conduit in the bypass configuration of the one or more valve; and configure the one or more valve in a recirculation configuration when the temperature of the fluid is below the temperature threshold, the outlet conduit fluidly connected to the inlet conduit via the recirculation conduit in the recirculation configuration of the one or more valve.

In some embodiments, the computer-readable medium has the instructions stored thereon executable by the processing unit to: adjust a flow rate of the fluid flowing through the one or more valve until the controller receives a signal from the sensor indicative that the temperature is within the temperature threshold.

In some embodiments, the flow inducer is a venturi fluidly connected to the inlet conduit upstream of the heat exchanger, the venturi having a throat and defining a suction inlet at the throat, the recirculation conduit fluidly connected to the suction inlet.

In some embodiments, the one or more valve includes both of a recirculation valve in fluid communication with the recirculation conduit and a bypass valve in fluid flow communication with the bypass conduit, the controller operatively connected to the recirculation valve and to the bypass valve.

In some embodiments, the computer-readable medium has the instructions stored thereon executable by the processing unit to: configure the one or more valve in a bypass configuration by causing the bypass valve to open and by causing the recirculation valve to close or to remain closed; and to configure the one or more valve in a recirculation configuration by causing the recirculation valve to open and by causing the bypass valve to close or to remain closed.

In some embodiments, the flow inducer is a pump fluidly connected to the recirculation conduit, the bypass conduit bypassing the pump, the controller operatively connected to the pump, wherein the computer-readable medium has the instructions stored thereon executable by the processing unit to: cause the pump to drive a flow of the fluid from the outlet conduit to the inlet conduit when the one or more valve is in the recirculation configuration.

In some embodiments, the one or more valve is a three-way valve, the three-way valve fluidly connecting the inlet conduit to the outlet conduit via the bypass conduit in the bypass configuration and fluid connecting the outlet conduit to the inlet conduit in the recirculation configuration.

In another aspect, there is provided a method of mitigating temperature variations at an outlet of a heat exchanger, comprising: transferring heat from a first fluid to a second fluid via a heat exchanger; determining that a temperature of the second fluid at an outlet of the heat exchanger is outside a predetermined temperature range; and diverting a portion of the second fluid flowing towards the heat exchanger to bypass the heat exchanger when the temperature is above the predetermined temperature range; or recirculating another portion of the second fluid through the heat exchanger by drawing the other portion of the second fluid from a first location downstream of the heat exchanger to a second location upstream of the heat exchanger when the temperature is below the predetermined temperature range.

The method described above may include any of the following features, in any combinations.

In some embodiments, the method includes receiving a signal from a sensor, the signal indicative that the temperature of the second fluid is outside the predetermined temperature range; and configuring one or more valve in fluid communication with a bypass conduit and with a recirculation conduit in a bypass configuration to divert the portion of the second fluid in the bypass conduit or in a recirculation configuration to recirculate the other portion of the second fluid in the recirculation conduit.

DESCRIPTION OF THE DRAWINGS

Reference is now made to the accompanying figures in which.

DETAILED DESCRIPTION

Figure 1:
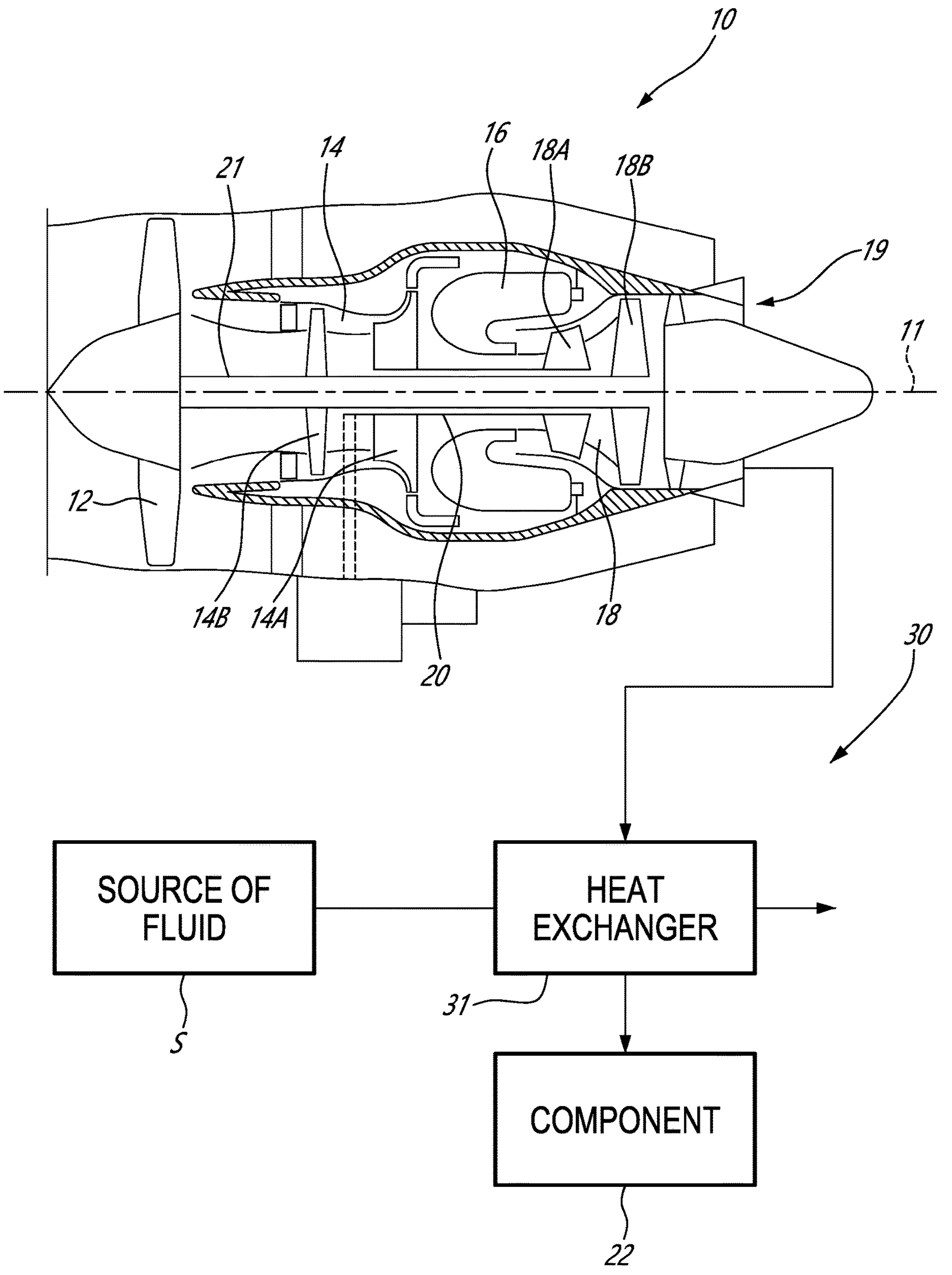
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section 18 to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure. Any thermal engine having an outlet outputting exhaust gases may be used instead of the gas turbine engine 10.

Advanced thermodynamic cycles may be employed to improve efficiency of the gas turbine engine 10. Some such cycles may employ bottoming cycles using secondary working fluids such as steam or hydrogen to recover waste heat from the gas turbine exhaust. These bottoming cycles may require a heat exchanger capable of providing a controlled output temperature of the working fluid over a wide range of externally defined hot and cold side flow rates, inlet temperatures, and inlet pressures.

As shown, the gas turbine engine 10 further has an exhaust 19 via which combustion gases exiting the turbine section 18 are expelled to an environment outside the gas turbine engine 10. In some situation, it may be desired to use heat from those combustion gases to heat another fluid before feeding this other fluid to a component 22 that uses this fluid for its operation. The fluid may be, for instance, liquid hydrogen, and the component 22 may be an expansion turbine. The turbine may be drivingly engaged to a generator, to a shaft of the gas turbine engine 10 or to any suitable accessory or combination thereof. A heat exchange system 30 may be provided for heating the fluid using the combustion gases. As shown in FIG. 1, the component 22 is fluidly connected to the exhaust 19 of the gas turbine engine 10. Hence, the component 22 may have an inlet in fluid flow communication to an outlet of the turbine section 18 of the gas turbine engine 10.

Figure 2:
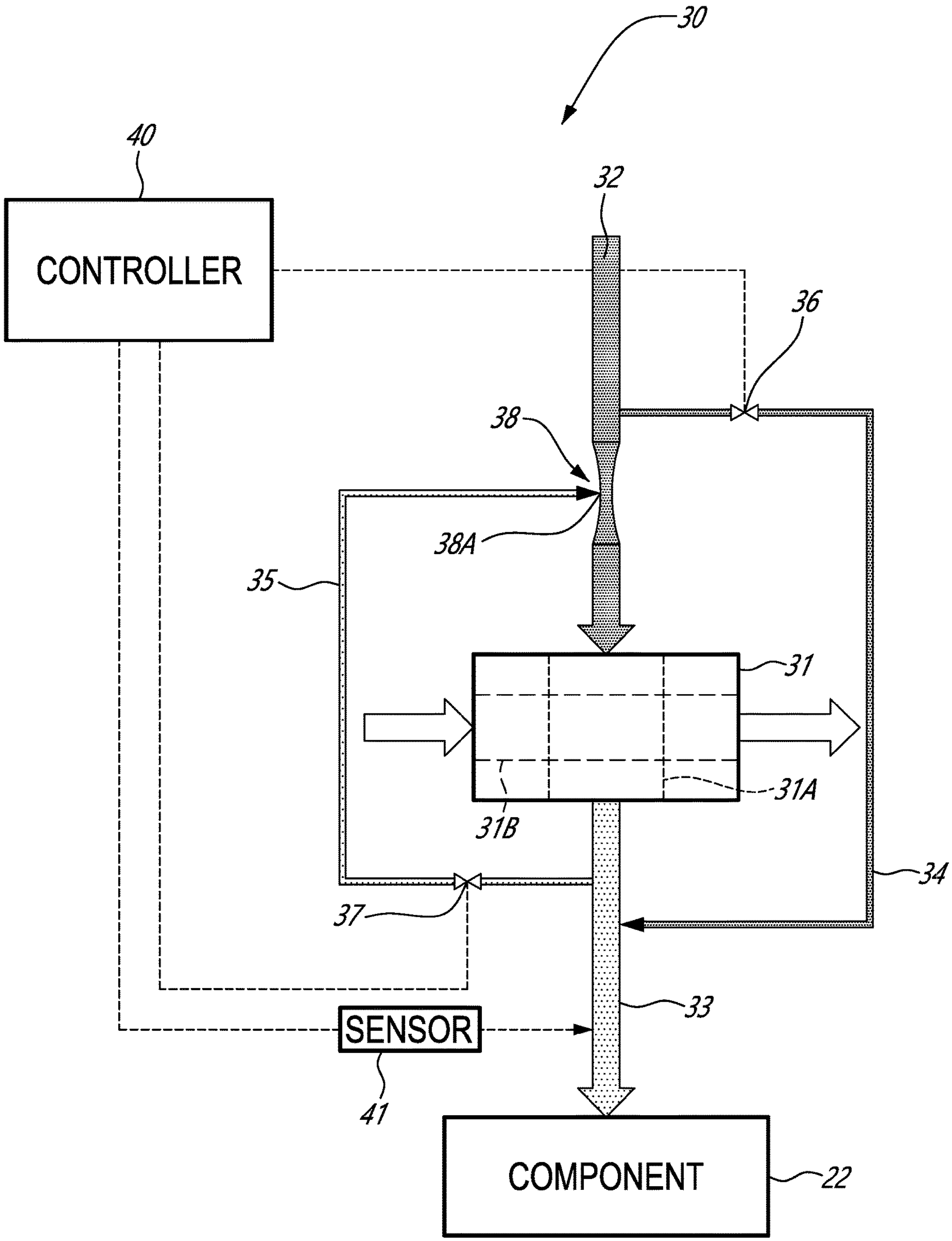
FIG. 2 is a schematic view of a heat exchange system in accordance with one embodiment for the aircraft engine of FIG. 1.

Referring now to FIG. 2, the heat exchange system 30 is described in more detail. In the embodiment shown, the heat exchange system 30 includes a heat exchanger 31 having a first conduit 31A and a second conduit 31B in heat exchange relationship with the first conduit 31A. It will be appreciated that the first and second conduits may each include a plurality conduits. The first conduit 31A is fluidly disconnected from the second conduit 31B such that the two fluids flowing in the heat exchanger 31 do not mix with one another. The second conduit 31B is in fluid flow communication with the exhaust 19 of the gas turbine engine 10. Thus, the fluid flowing through the first conduit 31A of the heat exchanger 31 is heated by the combustion gases flowing in the second conduit 31B. When the fluid is liquid hydrogen, the hydrogen enters the heat exchanger 31 in a liquid phase and gets evaporated inside the first conduit 31A to exit the heat exchanger 31 in a gaseous phase. A turbine downstream of the heat exchanger 31 may be used to extract energy from the gaseous hydrogen.

The heat exchange system 30 includes an inlet conduit 32 fluidly connecting a source of a fluid S (FIG. 1) to be heated by the combustion gases to an inlet of the first conduit 31A of the heat exchanger 31, and an outlet conduit 33 that fluidly connects an outlet of the first conduit 31A of the heat exchanger 31 to the component 22.

Therefore, as the combustion gases flow through the second conduit 31B of the heat exchanger 31 they transfer a portion of the heat to the fluid flowing from the source of the fluid S through the first conduit 31A of the heat exchanger 31. The fluid is therefore at a lower temperature than the combustion gases in this configuration. However, there may be variations in the temperature and/or flow rate of the combustion gases exiting the exhaust 19 of the gas turbine engine 10. These variations may be caused, for instance, by a power level of the gas turbine engine 10. Indeed, the gas turbine engine 10 is expected to generate hotter combustion gases at a higher flow rate during takeoff than during landing for instance. In some cases, the component 22 that uses the fluid heated by the combustion gases for its operation (e.g., turbine) may be sensitive to temperature variations of the fluid. Put differently, the component 22 may require to receive the fluid within a given temperature range to provide its optimal efficiency. Its efficiency may decrease quicky if the input temperature of the fluid falls outside this given temperature range.

The heat exchange system 30 may at least partially alleviate these drawbacks by incorporating loops allowing to compensate for variations in the temperature and/or flow rate of the combustion gases as will be described below, or variations in the temperature and/or flow rate of the fluid (e.g., hydrogen).

In the embodiment shown, the heat exchange system 30 includes a bypass conduit 34 fluidly connecting the inlet conduit 32 to the outlet conduit 33 while bypassing the heat exchanger 31. The bypass conduit may be said to extend in parallel to the heat exchanger 31. The heat exchange system 30 further includes a recirculation conduit 35 fluidly connecting the outlet conduit 33 to the inlet conduit 32 while bypassing the heat exchanger 31. Similarly, the recirculation conduit 35 is said to extend in parallel to the heat exchanger 31. A direction of the flow in the bypass conduit 34 is opposite that in the recirculation conduit 35.

The heat exchange system 30 further includes one or more valve for controlling the flow of the fluid through the heat exchanger 31, the bypass conduit 34, and the recirculation conduit 35. The one or more valve of this embodiment includes a bypass valve 36 fluidly connected to the bypass conduit 34 and a recirculation valve 37 fluidly connected to the recirculation conduit 35. The bypass valve 36 is located fluidly between an inlet of the bypass conduit and an outlet of the bypass conduit. Similarly, the recirculation valve 37 is located fluidly between an inlet of the recirculation conduit and an outlet of the recirculation conduit.

The bypass valve 36 and the recirculation valve 37 may both be ball valve or any suitable valve configurable in a plurality of configurations each having its respective cross-sectional area. Hence, each of these valves may have a fully closed configuration blocking fluid flow therethrough, a fully open configuration, and one or more intermediate configurations to vary a flow rate of the fluid therethrough. These may be actuated valve. More specifically, they may have valve members engaged by an actuator, such as a solenoid for instance. Thus, these valves are operable to selectively allow the fluid to flow in one of the recirculation conduit 35 and the bypass conduit 34 while limiting the fluid from flowing in the other of the recirculation conduit 35 and the bypass conduit 34.

Since a pressure of the fluid is expected through drop via its passage through the first conduit 31A of the heat exchanger 31, a flow inducer 38 may be required to locally reduce the pressure of the fluid in the inlet conduit 32 below the pressure in the outlet conduit 33 to ensure that a flow is possible from the outlet conduit 33 back into the inlet conduit 32. The flow inducer 38 is in fluid communication with the recirculation conduit 35 and is configured for inducing a flow from the outlet conduit 33 to the inlet conduit 32 via the recirculation conduit 35. In the embodiment shown, the flow inducer 38 is a venturi having a suction inlet 38A. An outlet of the recirculation conduit 35 is connected to the suction inlet 38A of the venturi. As shown in FIG. 2, the venturi defines a throat where a velocity of the fluid is maximal and thus where its pressure is minimal. The suction inlet 38A is located at the throat. The suction inlet 38A may be located slightly upstream or downstream of the throat in some configuration.

As shown in FIG. 2, a controller 40 is operatively connected to the bypass valve 36, to the recirculation valve 37, and to a sensor 41, which is operatively connected to the outlet conduit 33 and operable to generate a signal indicative of a temperature of the fluid flowing in the outlet conduit 33. More detail about the controller 40 are presented below.

Figure 3:
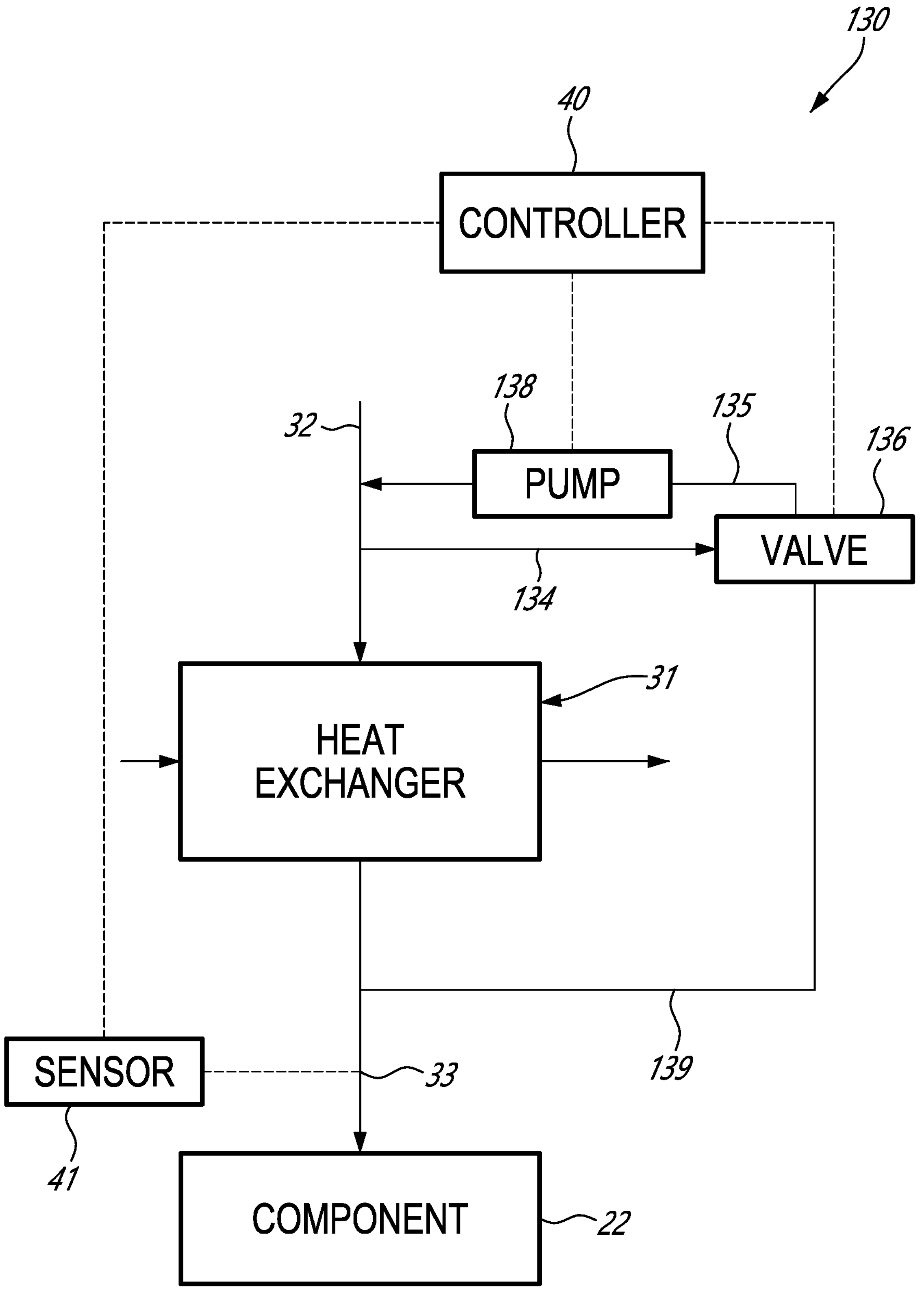
FIG. 3 is a schematic view of a heat exchange system in accordance with another embodiment for the aircraft engine of FIG. 1.

Referring now to FIG. 3, another embodiment of a heat exchange system is presented at 130. For the sake of conciseness, only features differing from the heat exchange system presented above with reference to FIG. 2 are described below.

In the embodiment shown, only a single valve, namely a three-way valve 136 is used. The three-way valve 136 has three connection ports: a first port connected to the bypass conduit 134, a second port connected to the recirculation conduit 135, and a third port connected to a common conduit 139. The bypass conduit 134 bypasses the pump 138. Thus, contrary to the configuration of FIG. 2 in which the bypass conduit and the recirculation conduit are fully separated from one another, in this configuration, the common conduit 139 acts as both of a portion of the recirculation conduit when the three-way valve 136 is in a recirculation configuration and as a portion of the bypass conduit when the three-way valve 136 is in a bypass configuration. In the present embodiment, the flow inducer is a pump 138 fluidly connected to the recirculation conduit 135 fluidly between the three-way valve 136 and the inlet conduit 32. The pump 138 may be any suitable pump known in the art such as a centrifugal pump, a gear pump, and so on. In some embodiments, the venturi may be used in conjunction with the three-way valve. The pump 138 is operatively connected to the controller 40 that causes its powering or powering off depending of the situation as will be discussed below.

To bypass the heat exchanger 31, the three-way valve 136, which is operatively connected to the controller 40, may be configured in the bypass configuration in which the three-way valve 136 fluidly connects the inlet conduit 32 to the outlet conduit 33 via the bypass conduit 134, through the three-way valve 136, and via the common conduit 139. To recirculate a portion of the flow flowing in the outlet conduit 33 back into the inlet conduit 32, the pump 138 may be powered on and the three-way valve 136 may be configured in the recirculation configuration in which the three-way valve 136 fluidly connects the outlet conduit 33 to the inlet conduit 32 via the common conduit 139, through the three-way valve 136, and via the recirculation conduit 135 through the pump 138.

In some configuration, the bypass conduit 134 and the recirculation conduit 135 may be the same conduit and the pump 138 may be operable in two different directions to selectively induce a flow from the inlet conduit 32 to the outlet conduit 33 or from the outlet conduit 33 to the inlet conduit 32.

Figure 4:
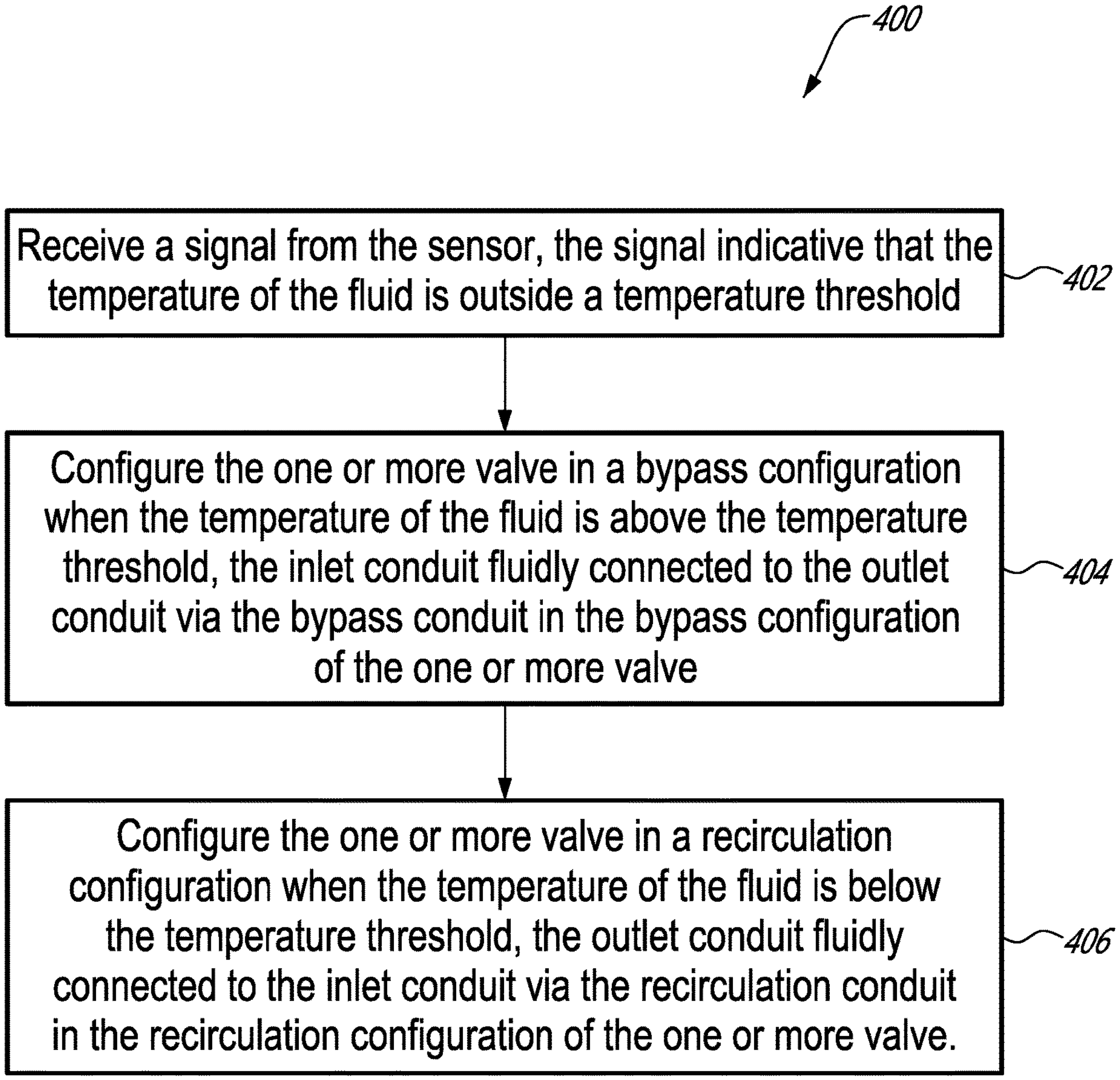
FIG. 4 is a flowchart illustrating steps of a method of mitigating temperature variations of a fluid heated via the heat exchange system of FIGS. 2-3.

Referring now to FIG. 4, the controller 40 is operatively connected to the sensor 41 and to the one or more valve (e.g., bypass valve 36 and recirculation valve 37 of FIG. 2 or three-way valve 136 of FIG. 3). The controller 40 is configured to execute steps of the method 400. The method 400 includes: receiving a signal from the sensor 41, the signal indicative that the temperature of the fluid is outside a temperature threshold at 402; configuring the one or more valve in a bypass configuration when the temperature of the fluid is above the temperature threshold at 404, the inlet conduit 32 is fluidly connected to the outlet conduit 33 via the bypass conduit 34, 134 in the bypass configuration of the one or more valve; and configuring the one or more valve in a recirculation configuration when the temperature of the fluid is below the temperature threshold at 406, the outlet conduit 33 is fluidly connected to the inlet conduit 32 via the recirculation conduit 35, 135 in the recirculation configuration of the one or more valve.

In the present embodiment, the controller 40 is further configured to adjust a flow rate of the fluid flowing through the one or more valve until the controller 40 receives a signal from the sensor 41 indicative that the temperature is within the temperature threshold.

In the embodiment of FIG. 2, the controller 40 is configured to configure the one or more valve in a bypass configuration by causing the bypass valve 36 to open and by causing the recirculation valve 37 to close or to remain closed; and to configure the one or more valve in a recirculation configuration by causing the recirculation valve 37 to open and by causing the bypass valve 36 to close or to remain closed.

In the embodiment of FIG. 3, the controller is configured to cause the pump 138 to drive a flow of the fluid from the outlet conduit 33 to the inlet conduit 32 when the three-way valve 136 is in the recirculation configuration.

Figure 5:
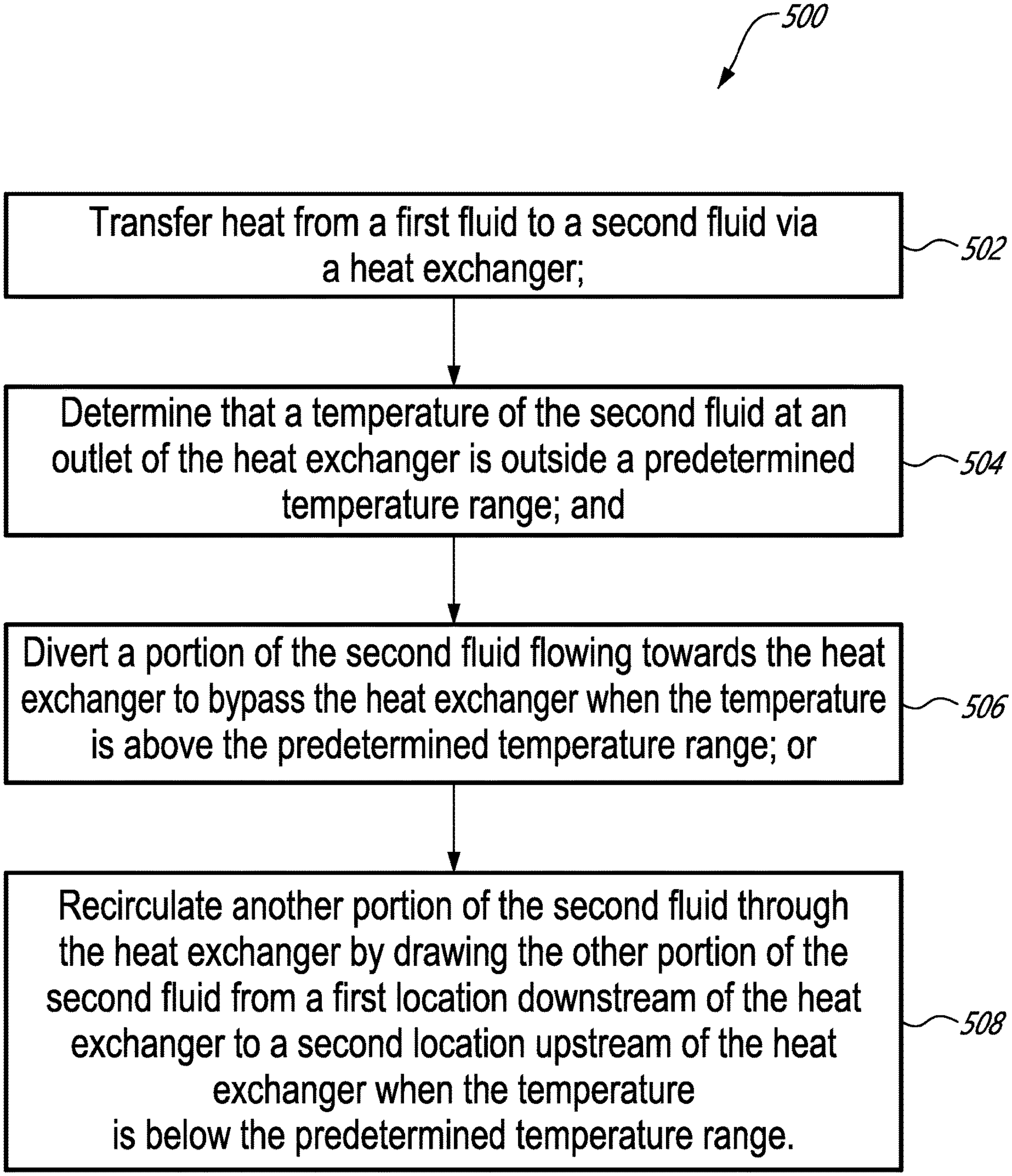
FIG. 5 is a flowchart illustrating steps of another method of mitigating temperature variations of a fluid heated via the heat exchange system of FIGS. 2-3.

Referring now to FIG. 5, another method of mitigating temperature variations at the outlet of the heat exchanger 31 is shown at 500. The method 500 includes: transferring heat from a first fluid to a second fluid via the heat exchanger 31 at 502; determining that a temperature of the second fluid at an outlet of the heat exchanger 31 is outside a temperature threshold at 504; and diverting a portion of the second fluid flowing towards the heat exchanger 31 to bypass the heat exchanger 31 when the temperature is above the temperature threshold at 506; or recirculating another portion of the second fluid through the heat exchanger 31 by drawing the other portion of the second fluid from a first location downstream of the heat exchanger 31 to a second location upstream of the heat exchanger 31 when the temperature is below the temperature threshold at 508.

In some embodiments, the receiving of the signal from the sensor includes receiving the signal indicative that the temperature of the second fluid is outside the temperature threshold; and configuring the one or more valve in a bypass configuration to divert the portion of the second fluid in the bypass conduit 34, 134 or in a recirculation configuration to recirculate the other portion of the second fluid in the recirculation conduit 35, 135.

Figure 6:
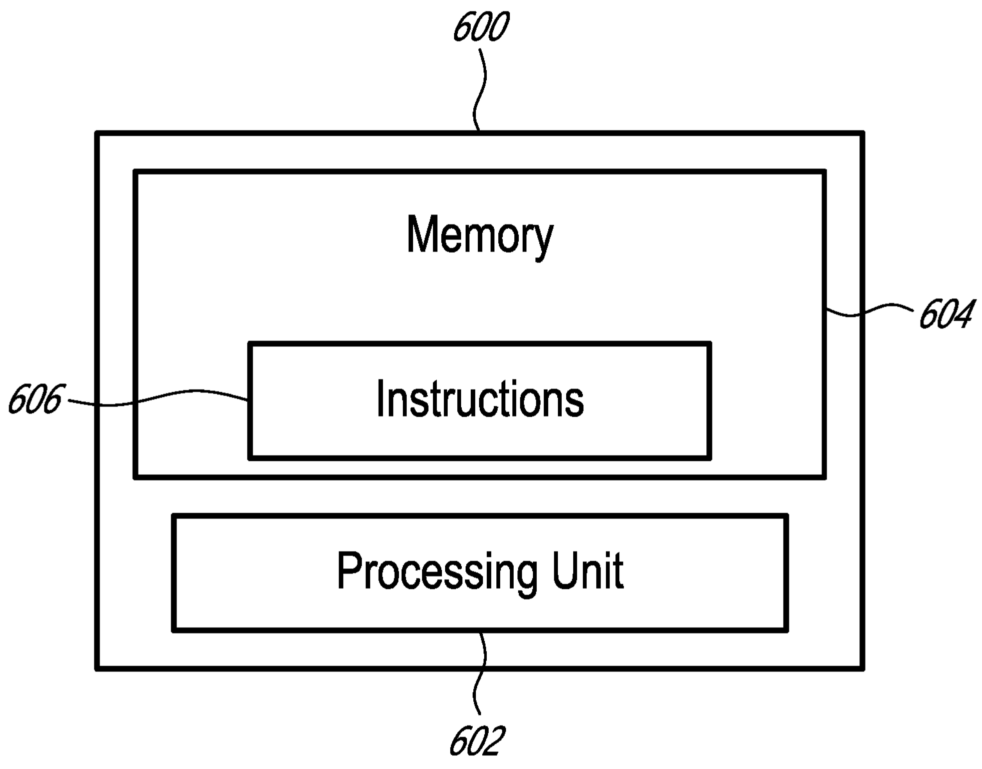
FIG. 6 is a schematic representation of a controller for the heat exchange system of FIGS. 2 and 3.

With reference to FIG. 6, an example of a computing device 600 is illustrated. For simplicity only one computing device 600 is shown but the system may include more computing devices 600 operable to exchange data. The computing devices 600 may be the same or different types of devices. The controller 40 may be implemented with one or more computing devices 600. Note that the controller 40 can be implemented as part of a full-authority digital engine controls (FADEC) or other similar device, including electronic engine control (EEC), engine control unit (ECU), electronic propeller control, propeller control unit, and the like. In some embodiments, the controller 40 is implemented as a Flight Data Acquisition Storage and Transmission system, such as a FAST™ system. The controller 40 may be implemented in part in the FAST™ system and in part in the EEC. Other embodiments may also apply.

The computing device 600 comprises a processing unit 602 and a memory 604 which has stored therein computer-executable instructions 606. The processing unit 602 may comprise any suitable devices configured to implement the methods 400, 500 such that instructions 606, when executed by the computing device 600 or other programmable apparatus, may cause the functions/acts/steps performed as part of the methods 400, 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for mitigating temperature variations described herein may be implemented in a high level procedural or object oriented programming or scripting language, or a combination thereof, to communicate with or assist in the operation of a computer system, for example the computing device 600. Alternatively, the methods and systems for mitigating temperature variations may be implemented in assembly or machine language. The language may be a compiled or interpreted language. Program code for implementing the methods and systems for mitigating temperature variations may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for mitigating temperature variations may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the methods 400, 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term “connected” or “coupled to” may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term “connected” or “coupled to” may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms “comprises”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:

a thermal engine having an outlet outputting exhaust gases;

a heat exchanger having a first conduit fluidly connected to a source of a fluid being at a lower temperature than the exhaust gases, and a second conduit fluidly connected to the outlet of the thermal engine and in heat exchange relationship with the first conduit;

an inlet conduit fluidly connecting the source of the fluid to an inlet of the first conduit of the heat exchanger;

an outlet conduit fluidly connected to an outlet of the first conduit of the heat exchanger;

a component fluidly connected to the outlet conduit;

a bypass conduit fluidly connecting the inlet conduit to the outlet conduit while bypassing the heat exchanger;

a recirculation conduit fluidly connecting the outlet conduit to the inlet conduit;

a recirculation valve and a bypass valve in fluid communication respectively with the recirculation conduit and the bypass conduit, the recirculation valve and the bypass valve respectively operable to selectively allow or limit the fluid to flow in the recirculation conduit and the bypass conduit;

a flow inducer in fluid communication with the recirculation conduit for inducing a flow from the outlet conduit to the inlet conduit via the recirculation conduit;

a sensor operatively connected to the outlet conduit; and a controller operatively connected to the sensor, the recirculation valve and the bypass valve, the controller having a processing unit and a computer-readable medium operatively connected to the processing unit and having instructions stored thereon executable by the processing unit to:

receive a signal from the sensor, the signal indicative that the temperature of the fluid is outside a temperature threshold;

configure the bypass valve and the recirculation valve in a bypass configuration when the temperature of the fluid is above the temperature threshold, wherein in the bypass configuration, the inlet conduit is fluidly connected to the outlet conduit via the bypass conduit, and the recirculation conduit is closed by the recirculation valve; and configure the bypass valve and the recirculation valve in a recirculation configuration when the temperature of the fluid is below the temperature threshold, wherein in the recirculation configuration, the outlet conduit is fluidly connected to the inlet conduit via the recirculation conduit, and the bypass conduit is closed by the bypass valve.

2. The aircraft engine of claim 1, wherein the computer-readable medium has the instructions stored thereon executable by the processing unit to:

adjust a flow rate of the fluid flowing through the recirculation valve and the bypass valve until the controller receives a signal from the sensor indicative that the temperature is within the temperature threshold.

3. The aircraft engine of claim 1, wherein the flow inducer is a venturi fluidly connected to the inlet conduit upstream of the heat exchanger, the venturi having a throat and defining a suction inlet at the throat, the recirculation conduit fluidly connected to the suction inlet.

4. The aircraft engine of claim 1, wherein the computer-readable medium has the instructions stored thereon executable by the processing unit to:

configure the bypass valve and the recirculation valve in the bypass configuration by causing the bypass valve to open and by causing the recirculation valve to close or to remain closed; and to configure the bypass valve and the recirculation valve in the recirculation configuration by causing the recirculation valve to open and by causing the bypass valve to close or to remain closed.

5. The aircraft engine of claim 1, wherein the flow inducer is a pump fluidly connected to the recirculation conduit, the bypass conduit bypassing the pump, the controller operatively connected to the pump, wherein the computer-readable medium has the instructions stored thereon executable by the processing unit to:

cause the pump to drive a flow of the fluid from the outlet conduit to the inlet conduit when the bypass valve and the recirculation valve are in the recirculation configuration.

6. The aircraft engine of claim 1, wherein the source of the fluid is a source of liquid hydrogen.

7. The aircraft engine of claim 1, wherein the component is an expansion turbine.

8. A heat exchange system for an aircraft engine, comprising:

a heat exchanger having a first conduit and a second conduit in heat exchange relationship with the first conduit, the first conduit fluidly connected to an inlet conduit upstream of the heat exchanger relative to a flow of a fluid through the first conduit, and fluidly connected to an outlet conduit downstream of the heat exchanger, the second conduit receiving exhaust gases generated by aircraft engine;

a bypass conduit fluidly connecting the inlet conduit to the outlet conduit and extending in parallel to the first conduit of the heat exchanger;

a recirculation conduit fluidly connecting the outlet conduit to the inlet conduit and extending in parallel to the first conduit of the heat exchanger;

a recirculation valve and a bypass valve respectively in fluid communication with the recirculation conduit and the bypass conduit, the recirculation valve and the bypass valve respectively operable to selectively allow or limit the fluid to flow in the recirculation conduit and the bypass conduit;

a flow inducer in fluid communication with the recirculation conduit for inducing a flow from the outlet conduit to the inlet conduit via the recirculation conduit;

a sensor operatively connected to the outlet conduit; and a controller operatively connected to the sensor, the recirculation valve and the bypass valve, the controller having a processing unit and a computer-readable medium operatively connected to the processing unit and having instructions stored thereon executable by the processing unit to:

receive a signal from the sensor, the signal indicative that a temperature of the fluid is outside a temperature threshold;

configure the recirculation valve and the bypass valve in a bypass configuration when the temperature of the fluid is above the temperature threshold, wherein in the bypass configuration, the inlet conduit is fluidly connected to the outlet conduit via the bypass conduit, and the recirculation conduit is closed by the recirculation valve; and configure the recirculation valve and the bypass valve in a recirculation configuration when the temperature of the fluid is below the temperature threshold, wherein in the recirculation configuration, the outlet conduit is fluidly connected to the inlet conduit via the recirculation conduit, and the bypass conduit is closed by the bypass valve.

9. The heat exchange system of claim 8, wherein the computer-readable medium has the instructions stored thereon executable by the processing unit to:

adjust a flow rate of the fluid flowing through the recirculation valve and the bypass valve until the controller receives a signal from the sensor indicative that the temperature is within the temperature threshold.

10. The heat exchange system of claim 8, wherein the flow inducer is a venturi fluidly connected to the inlet conduit upstream of the heat exchanger, the venturi having a throat and defining a suction inlet at the throat, the recirculation conduit fluidly connected to the suction inlet.

11. The heat exchange system of claim 8, wherein the computer-readable medium has the instructions stored thereon executable by the processing unit to:

configure the recirculation valve and the bypass valve in a bypass configuration by causing the bypass valve to open and by causing the recirculation valve to close or to remain closed; and to configure the recirculation valve and the bypass valve in a recirculation configuration by causing the recirculation valve to open and by causing the bypass valve to close or to remain closed.

12. The heat exchange system of claim 8, wherein the flow inducer is a pump fluidly connected to the recirculation conduit, the bypass conduit bypassing the pump, the controller operatively connected to the pump, wherein the computer-readable medium has the instructions stored thereon executable by the processing unit to:

cause the pump to drive a flow of the fluid from the outlet conduit to the inlet conduit when the recirculation valve and the bypass valve are in the recirculation configuration.

13. A method of mitigating temperature variations at an outlet of a heat exchanger, comprising:

transferring heat from a first fluid to a second fluid via a heat exchanger;

determining that a temperature of the second fluid at an outlet of the heat exchanger is outside a predetermined temperature range; and diverting a portion of the second fluid flowing towards the heat exchanger to bypass the heat exchanger in response to the temperature being above the predetermined temperature range; or recirculating another portion of the second fluid through the heat exchanger by drawing the other portion of the second fluid from a first location downstream of the heat exchanger to a second location upstream of the heat exchanger in response to the temperature being below the predetermined temperature range;

wherein determining that the temperature of the second fluid at the outlet of the heat exchanger is outside the predetermined temperature range comprises:

receiving a signal from a sensor, the signal indicative that the temperature of the second fluid is outside the predetermined temperature range; and wherein diverting and recirculating comprises:

configuring a bypass valve and a recirculation valve respectively in fluid communication with a bypass conduit and with a recirculation conduit in a bypass configuration to divert the portion of the second fluid in the bypass conduit or in a recirculation configuration to recirculate the other portion of the second fluid in the recirculation conduit.

* * * * *